Figure 1:
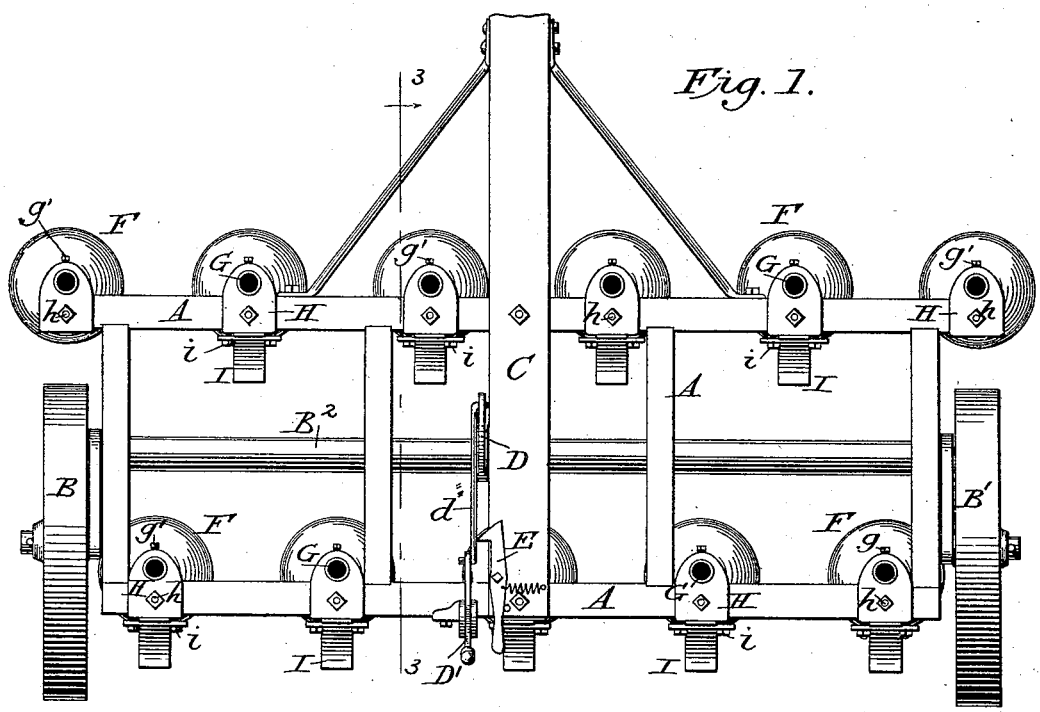

(No Model.) 2 Sheets—Sheet 1.

S. G. RANDALL.
HARROW.

No. 465,497. Patented Dec. 22, 1891.

Attest:
Sidney F. Hollingsworth
Baltus DeLong

Inventor.
SILAS G. RANDALL
by his attorneys,
Baldwin Davidson & Wright (No Model.) 2 Sheets—Sheet 2.

S. G. RANDALL.
HARROW.

No. 465,497. Patented Dec. 22, 1891.

ON LINE 3-3

Attest
Sidney P. Hollingworth
Ballus DeLong

Inventor
SILAS G. RANDALL
by his attorneys
Baldwin Davidson & Wight

UNITED STATES PATENT OFFICE.

SILAS G. RANDALL, OF GREENE, NEW YORK, ASSIGNOR TO AMELIA A. RANDALL, OF SAME PLACE.

HARROW.

SPECIFICATION forming part of Letters Patent No. 465,497, dated December 22, 1891.

Application filed January 28, 1891. Serial No. 379,442. (No model.)

*To all whom it may concern:*

Be it known that I, SILAS G. RANDALL, a citizen of the United States, residing at Greene, in the county of Chenango and State of New York, have invented a new and useful Harrow or Cultivator, of which the following is a specification.

The object of my invention is to produce a cultivator or harrow that will lift, loosen, and pulverize the soil without turning it over, so that grass, weeds, stubble, &c., will remain on its surface to serve as mulch. To this end I employ cone or bell shaped or pyramidal harrow-teeth—i. e., harrow-teeth whose exterior surfaces rise from their perimeters toward their centers in such manner and to such extent that the teeth are relatively deep in their axial lines as compared with flat or substantially flat disks. I mount them upon a carrying frame on axes vertical or substantially so, so that their perimeters or cutting-edges are presented horizontally to the soil and in such manner that they travel in right lines parallel with the draft and have axial motion caused by variation of pressure of the soil upon the sides thereof, the axial motion serving to prevent clogging. It is not material that a horizontal cross-section of such a tooth or the contour of its perimeter should show a circular outline, as such outline may be polygonal. It is material, however, in my invention, that the teeth shall be relatively deep in their axial lines—that is to say, that the angle of ascent of the inclined, sloping, or curved sides of the bell or cone shaped teeth should be so great as to cause the teeth under the influence of the draft to bury themselves in the soil, and that the sides of the teeth shall raise, loosen, and pulverize the soil without turning it over. This characteristic of the teeth employed distinguishes them from substantially flat disks which it has heretofore been proposed to mount on vertical axes on a draft-beam to act as hoes, but not as soil looseners and pulverizers, since such disks have practically no such capacity. I therefore disclaim the use of such flat or substantially flat disks, and, in my claims, when I speak of "bell or cone shaped harrow-teeth" I limit myself to teeth having inclined sides of the character above set forth—i. e., teeth sufficiently deep in their axial lines to accomplish the object of my invention.

The accompanying drawings represent one practical embodiment of my invention; but obviously other organizations may be designed to carry out the invention.

Figure 2:
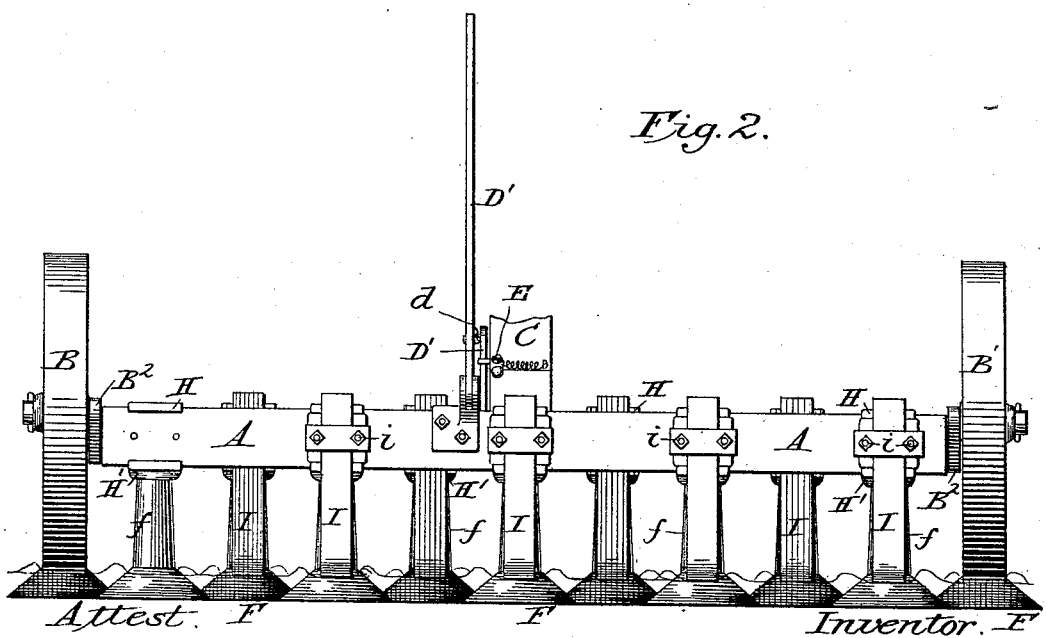
Figure 3:
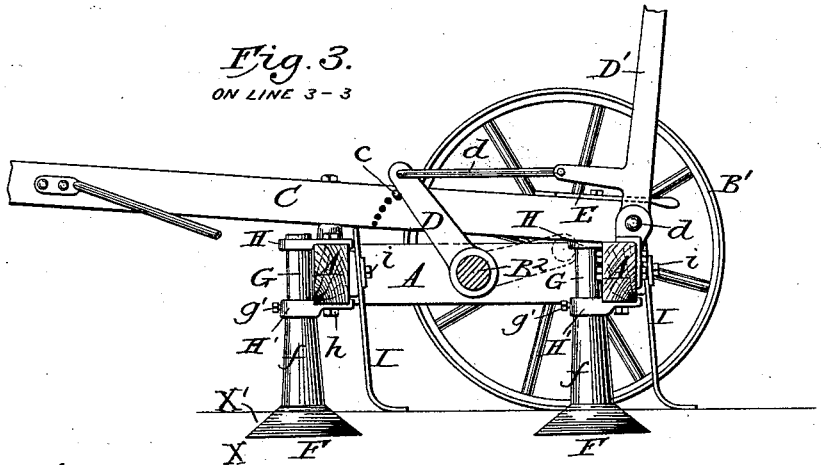
Figure 4:
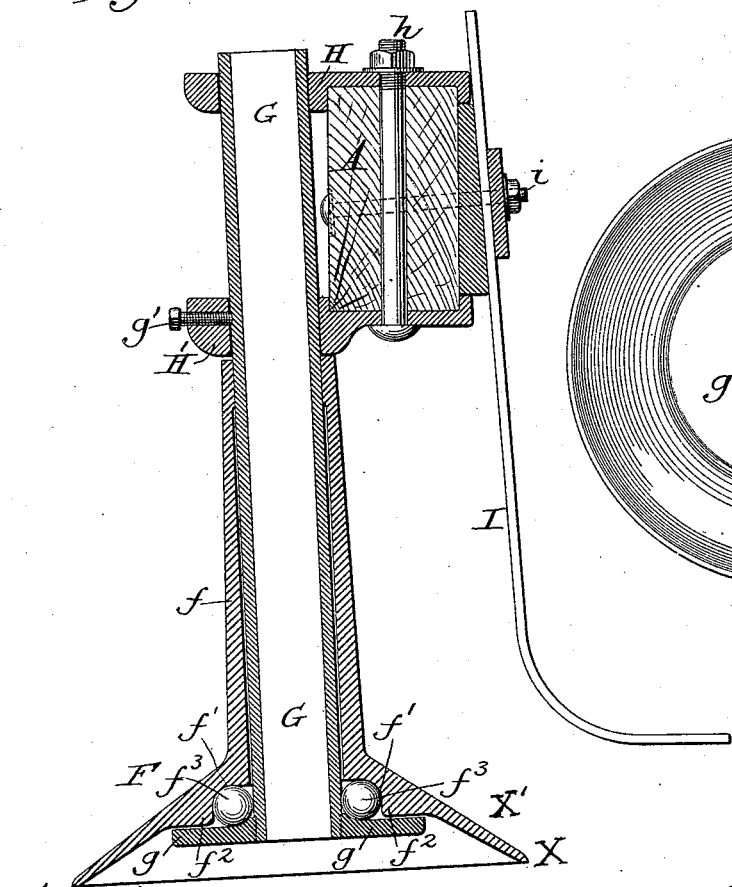
Figure 5:
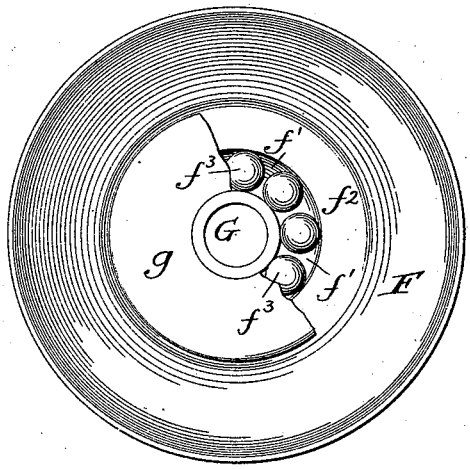

Figure 1 represents a plan or top view of the machine with the tongue broken off; Fig. 2, a rear elevation; and Fig. 3, a vertical longitudinal section on the line 3 3 of Fig. 1, looking toward the center of the machine. Fig. 4 represents a vertical central longitudinal section through one of the cone-teeth and its supports on an enlarged scale; and Fig. 5, an inverted plan or bottom view of a tooth, with a portion of the bottom flange of its sleeve broken away, more clearly to illustrate details of construction.

The drawings show a main frame A, carried by wheels B B', mounted on a crank-axle $B^2$. The frame is held against lateral horizontal movement relatively to the line of draft. A tongue C is rigidly secured to this frame, preferably at such an angle that when it is in the ring of the neck-yoke the frame A will be parallel with the surface of the ground. A crank-arm D on the axle $B^2$ is connected by a link $d$ with a hand-lever D', rocking on a pivot $d'$ on the frame, by means of which the frame and teeth may be raised or lowered. A suitable detent, consisting in this instance of a pin $c$, inserted in one of a series of holes in the tongue, serves to limit the descent of the frame and teeth, while a spring-latch E, pivoted on the tongue or frame, interlocks with the crank-arm D when the frame is sufficiently elevated and holds it clear of the ground for transportation. In this organization it will be seen that the entire machine is raised or lowered bodily upon the supporting-wheels. It is not essential, however, to the operation of the apparatus, as the teeth might be raised or lowered, if required, in other well-known ways.

Each tooth F is shown as of hollow cone, bell, or pyramidal shape, with the smaller end uppermost, and connected in the particular construction shown with a tubular shank, sleeve, or supporting-thimble $f$, and is provided within its open or hollow face, near its narrowest part, with an annular groove $f'$ and with a corresponding step or shoulder $f^2$. A stem or pivot-shaft G projects downwardly from the frame and through the sleeve and tooth, its projecting end being provided with a flange $g$, overlapping the shoulder $f^2$ and forming a support for a series of balls $f^3$, that run in the grooves $f'$, thus supporting the tooth and enabling it to turn freely on its stem. Any other suitable ball or anti-friction bearing may be used, and of course it may be differently located—i. e., it may be placed at any point between the tooth-support, sleeve, or spindle $f$ and the main frame. The stem or shaft G is shown as made of a metal tube—such as gas-pipe—movable vertically in sockets or bearings in the frame and clamped at any desired elevation by a set-screw $g'$. These sockets may each consist of metal brackets H H', embracing the upper and lower sides of the frame, and held there by a single bolt and nut $h$, which admits of their ready removal and replacement. The upper bracket H in the machine shown holds the stem or shaft farther from the frame A than the lower one and gives a slight inclination to the stem, and consequently to the tooth, so that its front edge is tipped slightly forward, thereby giving it an under clearance and greater draft.

The horizontal perimeter X of the tooth is its cutting-edge, and as it enters the soil the inclined, curved, or sloping sides X' cause the tooth to draw down into the soil, so that it runs and works beneath the surface, and its rising sides lift, loosen, and pulverize the soil without turning it over.

Guard shoes or pressers $l$, secured to the frame-timbers, with their shanks slightly inclined by clamp-bolts $i$ to permit of their vertical adjustment, may, if desired, be employed. They bear upon the loosened soil and counteract the tendency of the cone-teeth to run too deeply therein.

A seat for the driver may be mounted on the frame as usual, if desired.

The drawings show a harrow. The teeth are mounted upon the frame in two gangs or ranks, six teeth being shown in the front gang and five in the rear, and those of the rear gang are in line with the spaces between those of the front gang. The outer teeth of the front rank, it will be observed, are arranged in front of the supporting-wheels, so as to grade or smooth their paths. The spring-runners or presser-shoes $l$ each lie behind their respective cone-teeth, but are omitted behind the outer teeth in front of the wheels.

The operation of the apparatus will readily be understood from the foregoing description. As the machine proceeds the teeth move on lines parallel with the line of draft, the front sides of the teeth cutting into the soil, and are by the draft drawn down into it, lifting and stirring but not turning it over, thus permitting any vegetable matter to remain on the surface. Any preponderance of pressure on one side of a tooth causes it to turn, and thus present a new cutting-edge to the soil. The pressure-shoes, as before stated, serve to gage the depth of cut and help to bear the weight of the frame when the cutters tend to sink below the normal depth. They may, however, be omitted, as the machine works efficiently without them.

I claim as my invention—

1. In a harrow or cultivator, the combination, with a frame, of rotatable bell or cone shaped harrow-teeth relatively deep in their axial lines, whose axes are vertical, or substantially so, carried thereby, and moving with the frame in right lines parallel with the draft, the teeth having horizontal or substantially horizontal annular cutting-edges X and upwardly and inwardly inclined sides X', that cause the teeth to bury themselves in the soil and lift, loosen, and pulverize the soil without turning it over, all substantially as and for the purpose set forth.

2. In a harrow or cultivator, the combination, with a frame, of rotatable bell or cone shaped harrow-teeth relatively deep in their axial lines, whose axes are vertical, or substantially so, carried thereby, and moving with the frame in right lines parallel with the draft, the teeth having horizontal or substantially horizontal annular cutting-edges X and upwardly and inwardly inclined sides X', that cause the teeth to bury themselves in the soil and lift, loosen, and pulverize the soil without turning it over, and gages for limiting the depth of penetration of the teeth, all substantially as and for the purpose set forth.

3. In a harrow or cultivator, the combination, with a frame, of rotatable bell or cone shaped harrow-teeth relatively deep in their axial lines, whose axes are vertical, or substantially so, carried thereby, and moving with the frame in right lines parallel with the draft, the teeth having horizontal or substantially horizontal annular cutting-edges X and upwardly and inwardly inclined sides X', that cause the teeth to bury themselves in the soil and lift, loosen, and pulverize the soil without turning it over, and anti-friction or ball bearings for the teeth, all substantially as and for the purpose set forth.

4. In a harrow or cultivator, the combination of a frame, its carrying-wheels, a tongue secured to the frame, a series of individually-rotatable bell or cone shaped teeth relatively deep in their axial lines, whose axes are vertical, or substantially so, having horizontal or substantially horizontal annular cutting-edges X and upwardly and inwardly inclined sides X', that cause the teeth to bury themselves in the soil and lift, loosen, and pulverize the soil without turning it over, and anti-friction or ball bearings for the teeth, all substantially as and for the purpose set forth.

5. In a harrow or cultivator, the combination of a frame, its carrying-wheels, a tongue secured to the frame, a series of individually-rotatable bell or cone shaped teeth relatively deep in their axial lines, whose axes are vertical, or substantially so, having horizontal or substantially horizontal annular cutting-edges X and upwardly and inwardly inclined sides X', that cause the teeth to bury themselves in the soil and lift, loosen, and pulverize the soil without turning it over, anti-friction or ball bearings for the teeth, and means for raising and lowering the frame relatively to the carrying-wheels, all substantially as and for the purpose set forth.

6. The combination, substantially as set forth, of a frame, a series of bracing-shanks depending therefrom, a series of bell or cone shaped harrow-teeth having substantially horizontal cutting-edges and vertical axes and formed with vertical sleeves encircling the depending shanks, and anti-friction devices upon which the sleeves and teeth turn.

In testimony whereof I have hereunto subscribed my name.

SILAS G. RANDALL.

Witnesses:
L. E. CHASE,
LESTER CHASE.